(12) United States Patent
Ray et al.

(10) Patent No.: US 11,350,132 B2
(45) Date of Patent: May 31, 2022

(54) HIGH LEVEL SYNTAX FOR GEOMETRY-BASED POINT CLOUD COMPRESSION

(71) Applicant: QUALCOMM Incorporated, San Diego, CA (US)

(72) Inventors: Bappaditya Ray, San Diego, CA (US); Adarsh Krishnan Ramasubramonian, Irvine, CA (US); Geert Van der Auwera, Del Mar, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/143,607

(22) Filed: Jan. 7, 2021

(65) Prior Publication Data

US 2021/0211734 A1    Jul. 8, 2021

Related U.S. Application Data

(60) Provisional application No. 62/968,578, filed on Jan. 31, 2020, provisional application No. 62/960,472,
(Continued)

(51) Int. Cl.
*H04N 19/70* (2014.01)
*H04N 19/597* (2014.01)
(Continued)

(52) U.S. Cl.
CPC ........... *H04N 19/70* (2014.11); *H04N 19/174* (2014.11); *H04N 19/30* (2014.11); *H04N 19/597* (2014.11)

(58) Field of Classification Search
CPC ...... H04N 19/70; H04N 19/174; H04N 19/30; H04N 19/597
See application file for complete search history.

(56) References Cited

U.S. PATENT DOCUMENTS

2020/0118331 A1\* 4/2020 Georgiou .................. G06T 9/00
2021/0319571 A1\* 10/2021 Oh ......................... G06T 19/006

FOREIGN PATENT DOCUMENTS

EP    3554083 A1    10/2019

OTHER PUBLICATIONS

"G-PCC Future Enhancements", 128. MPEG Meeting, Oct. 7, 2019-Oct. 11, 2019, Geneva, CH (Motion Picture Expert Croup or ISO/IEC JTC1/SC29/WG11), No. n18887, Dec. 23, 2019 (Dec. 23, 2019), XP030225587, Retrieved from the Internet: URL: http://phenix.int-evry.fr/mpeg/doc_end_user/documents/128_Geneva/wg11/w18887.zip. w18887/w18887 G-PCC-Future Enhancements_d12_clean.docx. [retrieved on Dec. 23, 2019], 277 pp.
(Continued)

*Primary Examiner* — Jae N Noh
(74) *Attorney, Agent, or Firm* — Shumaker & Sieffert, P.A.

(57) ABSTRACT

An example device for coding a point cloud includes a memory configured to store the point cloud and one or more processors communicatively coupled to the memory. The one or more processors are configured to determine a value of a numerator syntax element, the value of the numerator syntax element being indicative of a numerator of a scale factor of the point cloud. The one or more processors are configured to determine a value of a denominator syntax element, the value of the denominator syntax element being indicative of a denominator of the scale factor of the point cloud. The one or more processors are configured to process the point cloud at least in part based on the scale factor of the point cloud.

32 Claims, 5 Drawing Sheets

Related U.S. Application Data filed on Jan. 13, 2020, provisional application No. 62/958,399, filed on Jan. 8, 2020.

(51) Int. Cl.
*H04N 19/174* (2014.01)
*H04N 19/30* (2014.01)

(56) References Cited

OTHER PUBLICATIONS

3DG: "G-PCC Codec Description v5", Coding of Moving Pictures and Audio, ISO/IEC JTC1/SC29/WG11, N18891, Oct. 2019, Geneva, CH, Dec. 13, 2019, 75 pages.

"Information Technology—MPEG-I (Coded Representation of Immersive Media)—Part 9: Geometry-based Point Cloud Compression", CD Stage, ISO/IEC 23090-9:2019(E), ISO/IEC JTC 1/SC 29/WG 11, 2019, 129 pages.

International Search Report and Written Opinion—PCT/US2021/012674—ISA/EPO—dated Apr. 13, 2021 (201741WO).

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Ray B., et al., "[G-PCC] High Level Syntax Cleanup", Coding of Moving Pictures and Audio, ISO/IEC JTC1/SC29/WG11, MPEG2020/m52342, Brussels, Belgium, Jan. 2020, 14 pages.

Zhang X., et al., "[G-PCC][New Proposal] Signaling Delta QPs for Adaptive Geometry Quantization in Point Cloud Coding", Coding of Moving Pictures and Audio, ISO/IEC JTC1/SC29/WG11, MPEG2019/m49232, Gothenburg, Sweden, Jul. 2019, 10 pages.

* cited by examiner

HIGH LEVEL SYNTAX FOR GEOMETRY-BASED POINT CLOUD COMPRESSION

This patent application claims the benefit of U.S. Provisional Patent Application No. 62/958,399, filed Jan. 8, 2020, U.S. Provisional Patent Application No. 62/960,472, filed Jan. 13, 2020, and U.S. Provisional Patent Application 62/968,578, filed Jan. 31, 2020, the entire content of each of which is incorporated by reference.

TECHNICAL FIELD

This disclosure relates to point cloud encoding and decoding.

SUMMARY

In general, this disclosure describes techniques for point cloud encoding and decoding, including techniques related to geometry-based point cloud compression (G-PCC). The details of one or more examples are set forth in the accompanying drawings and the description below. One example draft of the G-PCC standard may result in point cloud coding techniques that include unnecessary signaling and/or signaling including more bits than may be necessary. This disclosure includes techniques to reduce signaling overhead associated with G-PCC. Other features, objects, and advantages will be apparent from the description, drawings, and claims.

In one example, a method of coding a point cloud includes determining a value of a numerator syntax element, the value of the numerator syntax element being indicative of a numerator of a scale factor of the point cloud, determining a value of a denominator syntax element, the value of the denominator syntax element being indicative of a denominator of the scale factor of the point cloud, and processing the point cloud based at least in part on the scale factor of the point cloud.

In another example, a device for coding a point cloud includes memory configured to store the point cloud, and one or more processors communicatively coupled to the memory, the one or more processors being configured to: determine a value of a numerator syntax element, the value of the numerator syntax element being indicative of a numerator of a scale factor of the point cloud; determine a value of a denominator syntax element, the value of the denominator syntax element being indicative of a denominator of the scale factor of the point cloud; and process the point cloud based at least in part on the scale factor of the point cloud.

In another example, a non-transitory computer-readable storage medium stores instructions, which, when executed by one or more processors cause the one or more processors to determine a value of a numerator syntax element, the value of the numerator syntax element being indicative of a numerator of a scale factor of a point cloud, determine a value of a denominator syntax element, the value of the denominator syntax element being indicative of a denominator of the scale factor of the point cloud, and process the point cloud based at least in part on the scale factor of the point cloud.

In another example, a device includes means for determining a value of a numerator syntax element, the value of the numerator syntax element being indicative of a numerator of a scale factor of the point cloud, means for determining a value of a denominator syntax element, the value of the denominator syntax element being indicative of a denominator of the scale factor of the point cloud, and means for processing the point cloud at least in part based on the scale factor of the point cloud.

The details of one or more examples are set forth in the accompanying drawings and the description below. Other features, objects, and advantages will be apparent from the description, drawings, and claims.

DETAILED DESCRIPTION

One example draft of the G-PCC standard may result in point cloud coding techniques that include unnecessary signaling and/or signaling including more bits than may be necessary. As such, the signaling according to the draft standard may lead to poorer functionality and larger signaling overhead than may otherwise be possible. According to the techniques of this disclosure, certain syntax elements of the draft G-PCC standard may be represented in fewer bits than set forth in the draft standard and other certain syntax elements may not be signaled. By representing certain syntax elements in fewer bits and not signaling other certain syntax elements, a G-PCC encoder may reduce signaling overhead associated with the syntax elements, and thereby may also reducing processing power consumption of the G-PCC encoder and/or a G-PCC decoder.

Figure 1:
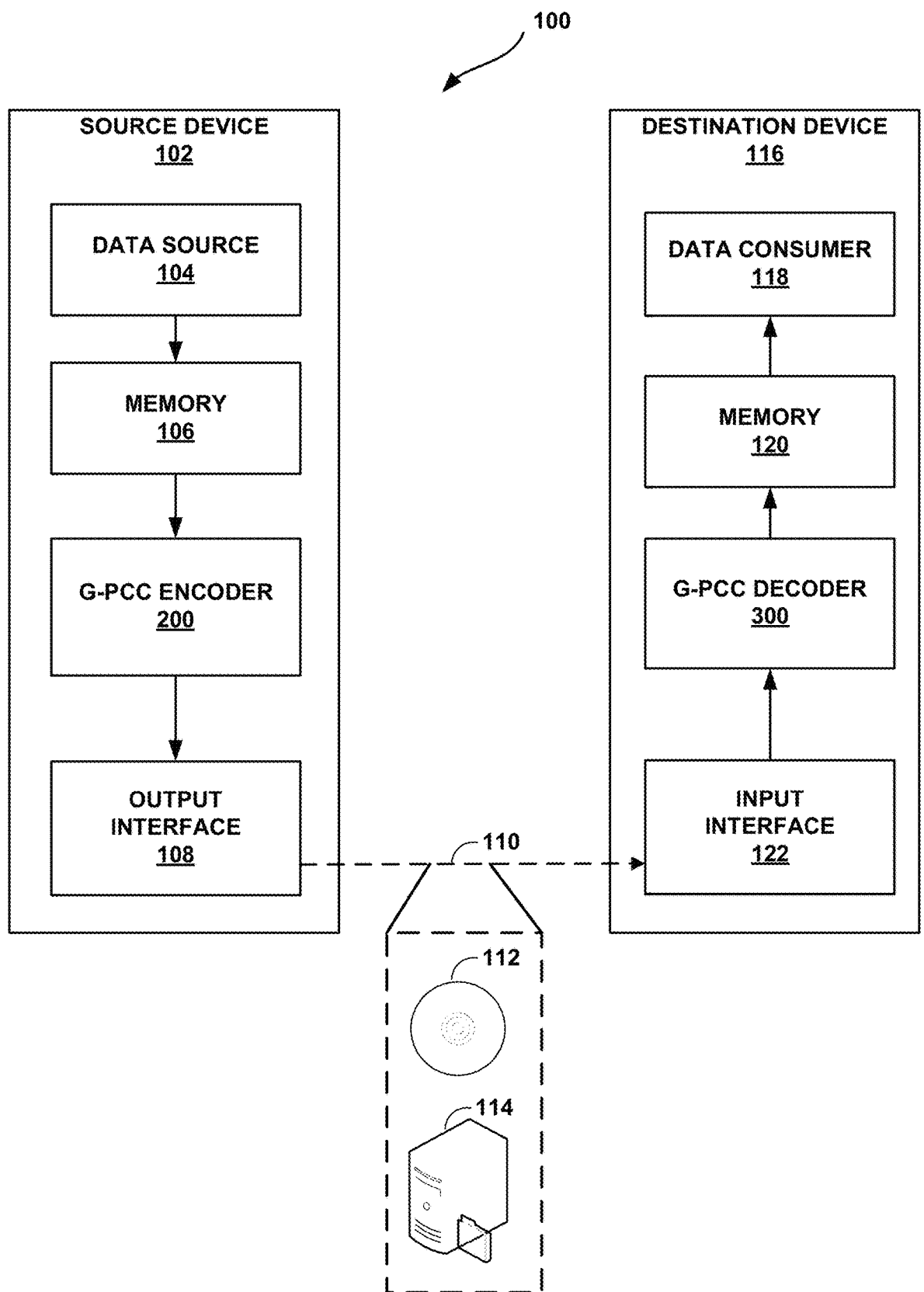
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to signaling associated with coding (encoding and/or decoding) point cloud data. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to high level syntax for geometry-based point cloud compression. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform of the techniques of this disclosure related to high level syntax for geometry point cloud compression. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). The signaling information may include syntax elements as defined according to the techniques of this disclosure or not include certain syntax elements under certain conditions as set forth in this disclosure. Data consumer 118 uses the decoded data. For example, data consumer 118 may use the decoded data to determine the locations of physical objects. In some examples, data consumer 118 may comprise a display device to present imagery based on a point cloud.

G-PCC encoder 200 and G-PCC decoder 300 each may be implemented as any of a variety of suitable encoder and/or decoder circuitry, such as one or more processors, microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard of a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. These syntax elements may include syntax elements as defined in this disclosure. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of other approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds).

A point cloud contains a set of points in a 3D space, and may have attributes associated with the point. The attributes may be color information such as R, G, B or Y, Cb, Cr, or reflectance information, or other attributes. Point clouds may be captured by a variety of capture devices, such as cameras or sensors, such as LIDAR sensors, and 3D scanners, and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box in to slices and tiles may be based on number of points in each partition, or based on other considerations (e.g., a particular region may be coded as tiles). The slice regions may be further partitioned using splitting decisions similar to those in video codecs.

Figure 2:
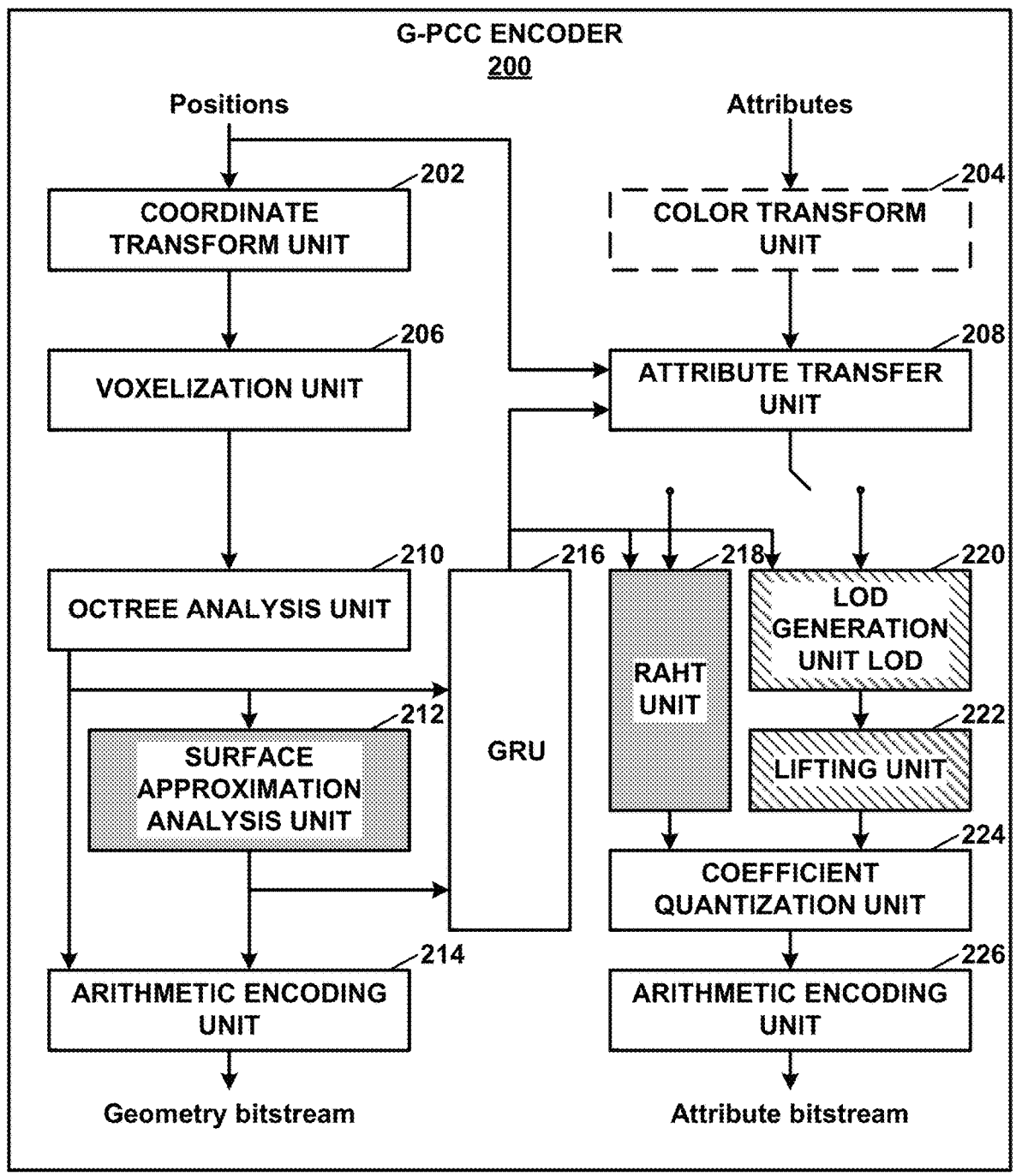
FIG. 2 is a block diagram illustrating an example Geometry Point Cloud Compression (G-PCC) encoder.

FIG. 2 provides an overview of G-PCC encoder 200. FIG. 2 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

Figure 3:
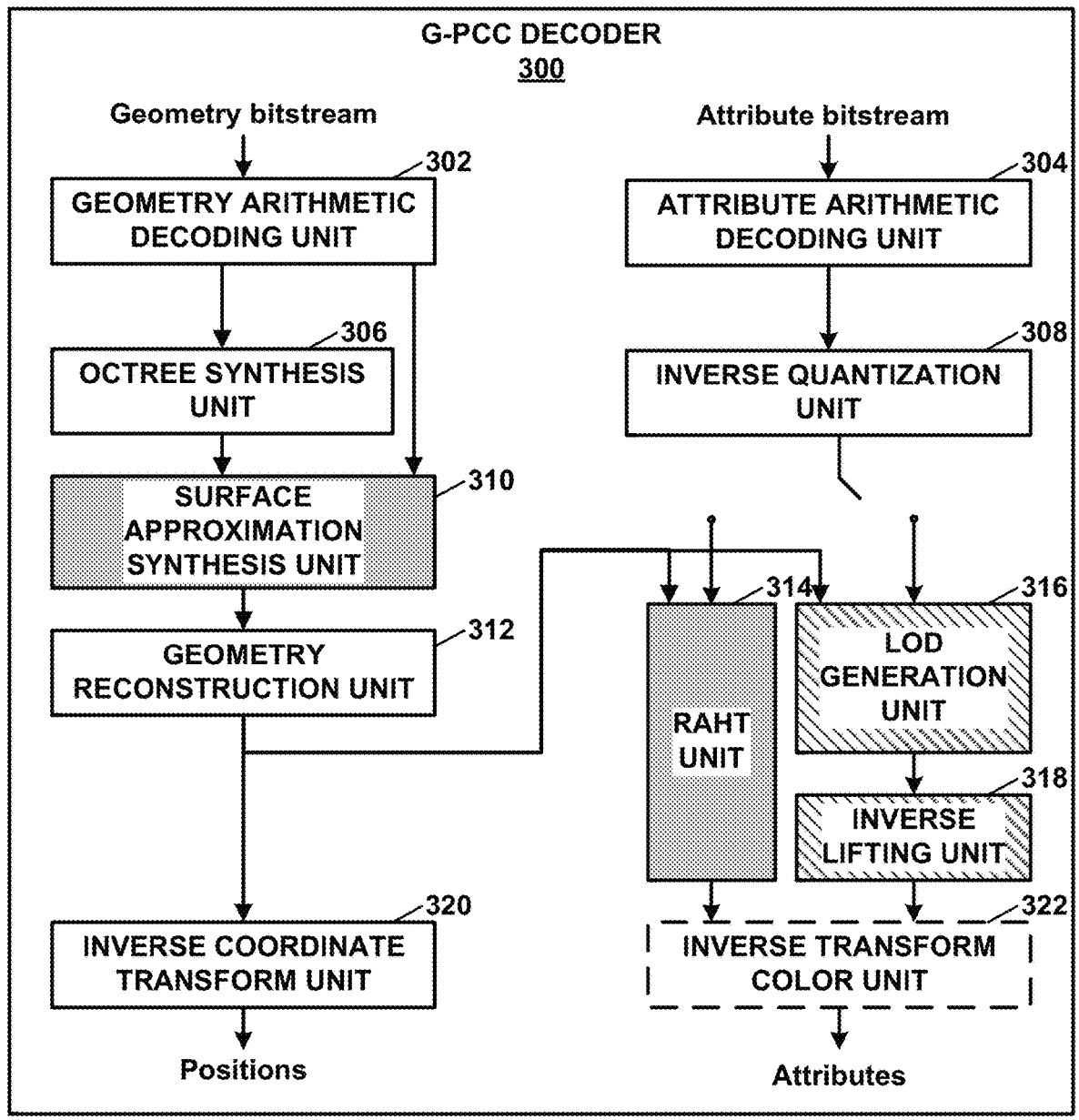
FIG. 3 is a block diagram illustrating an example G-PCC decoder.

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3. See G-PCC Future Enhancements, ISO/IEC JTC1/SC29/WG11 w18887, Geneva, Switzerland, October 2019 (hereinafter "document w18887").

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the user (e.g., G-PCC encoder 200) has the option to choose which of the 3 attribute codecs to use.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residual obtained as the output of the coding methods for the attributes are quantized. The quantized residual may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit (GRU) 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream and an attribute bitstream. Geometry arithmetic decoding unit 302 of G-PCC decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud from a transform domain back into an initial domain.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LoD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of G-PCC encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by G-PCC encoder 200 and G-PCC decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Document w18887, which is mentioned above, is a G-PCC draft document. This draft of the G-PCC standard may include unnecessary signaling and/or signaling including more bits than may be necessary. The representation of high-level syntax (HLS) of G-PCC may be improved to achieve better functionality and reduce the associated signaling cost of different HLS related parameters. According to the techniques of this disclosure, certain syntax elements of the document w18887 may be represented in fewer bits than proscribed in the draft standard and other certain syntax elements may not be signaled. By representing certain syntax elements in fewer bits and not signaling other certain syntax elements, G-PCC encoder 200 may reduce signaling overhead associated with the syntax elements, and thereby may also reducing processing power consumption of G-PCC encoder 200 and/or G-PCC decoder 300.

This disclosure discusses various improvements for high level syntax of G-PCC that may be made with respect to document w18887. The various techniques set forth herein may be applied independently, or one or more techniques may be applied in any combination.

The interaction of three particular syntax elements is now discussed. The geometry parameter set (GPS) syntax in document w18887 includes these three syntax elements: log2_trisoup_node_size (which is indicative of the size of triangle nodes); inferred_direct_coding_mode_enabled_flag (which is indicative of whether a direct_mode_flag may be present in the geometry node syntax); and unique_geometry_points_flag (which is indicative of whether in all slices that refer to the current GPS, whether all output points have unique positions within a given slice). Although G-PCC encoder 200 may signal these syntax elements (e.g., log2_trisoup_node_size, inferred_direct_coding_mode_enabled_flag, and unique_geometry_points_flag) independently, they have an inherent interaction with each other, which is evident in their semantics, as shown below. Throughout this document, text between the <E> . . . </E> tags denote emphasized parts of the original G-PCC syntax description of document w18887. Furthermore, throughout this disclosure, text between the <M> . . . </M> tags denote modified text of the original G-PCC syntax description in document w18887 due to the techniques of this disclosure. Text between the <D> . . . </D> tags denote text deleted from the original G-PCC syntax description in document w18887 due to the techniques of this disclosure.

| | |
|---|---|
| <E>    unique_geometry_points_flag </E> | <E>u(1)</E> |
| geometry_planar_mode_flag | u(1) |
| geom_planar_mode_th_IDCM | ue(v) |
| if( geometry_planar_mode_flag ){ | |
|     geom_planar_mode_th[0] | ue(v) |
|     geom_planar_mode_th[1] | ue(v) |
|     geom_planar_mode_th[2] | ue(v) |

-continued

```
    }
    neighbour_context_restriction_flag                      u(1)
<E>     inferred_direct_coding_mode_enabled _flag</E>       <E>u(1)</E>
    bitwise_occupancy_coding_flag                           u(1)
    adjacent_child_contextualization_enabled_flag           u(1)
    log2_neighbour_avail_boundary                           ue(v)
    log2_intra_pred_max_node_size                           ue(v)
<E>     log2_trisoup_node_size</E>                          <E>ue(v)</E>
``` log2_trisoup_node_size specifies the variable TrisoupNodeSize as the size of the triangle nodes as follows.

TrisoupNodeSize=1<<log2_trisoup_node_size

When log2_trisoup_node_size is equal to 0, the geometry bitstream includes only the octree coding syntax. <M>When log2_trisoup_node_size is greater than 0, it is a requirement of bitstream conformance that:

inferred_direct_coding_mode_enabled_flag must be equal to 0, and unique_geometry_points_flag must be equal to 1.</M>

Therefore, in some examples, a device, such as G-PCC encoder 200 or G-PCC decoder 300, may determine whether a value of a trisoup syntax element indicative of a size of triangle nodes is greater than 0, based on the value of the trisoup syntax element being greater than 0: infer a value of an inferred direct coding mode enabled syntax element indicative of whether a direct mode syntax element is present in a bitstream to be 0; and infer a value of a unique geometry points syntax element indicative of whether all output points in all slices that refer to a current geometry parameter sets have unique positions within a respective slice to be 1. Coding the point cloud may be based at least in part (and in some examples, further) based on the value of the trisoup syntax element. In this manner, G-PCC encoder 200 may reduce signaling overhead when compared to the signaling described in document w18887.

In some examples, a device, such as G-PCC encoder 200 or G-PCC decoder 300, may determine that a bitstream is not in conformance with a coding standard based on either a first syntax element not being equal to 0 or a second syntax element not being equal to 1, wherein: the first syntax element equal to 1 indicates whether a third syntax element may be present in geometry node syntax, the second syntax element equal to 1 indicates that in all slices that refer to the current geometry parameter set, all output points have unique positions within a slice, and the third syntax element indicating whether a single child node of the current node is a leaf node and contains one or more delta point coordinates.

From the semantics of document w18887, it can be deduced that when log2_trisoup_node_size is greater than 0, G-PCC decoder 300 may derive inferred_direct_coding_mode_enabled_flag and unique_geometry_points_flag without parsing the inferred_direct_coding_mode_enabled_ flag and unique_geometry_points_flag syntax elements in a received bitstream. Thus, in accordance with one example of the disclosure, G-PCC encoder 200 and G-PCC decoder 300 may operate according to the following modification which removes redundant signaling when trisoup is enabled, and also bypasses the conformance check.

```
<D>     unique_geometry_points_flag</D>                     <D>u(1)</D>
    geometry_planar_mode_flag                               u(1)
    geom_planar_mode_th_IDCM                                ue(v)
    if( geometry_planar_mode_flag ){
        geom_planar_mode_th[0]                              ue(v)
```

-continued

```
        geom_planar_mode_th[1]                              ue(v)
        geom_planar_mode_th[2]                              ue(v)
    }
    neighbour_context_restriction_flag                      u(1)
<D> inferred_direct_coding_mode_enabled_flag</D>            <D>u(1)</D>
    bitwise_occupancy_coding_flag                           u(1)
    adjacent_child_contextualization_enabled_flag           u(1)
    log2_neighbour_avail_boundary                           ue(v)
    log2_intra_pred_max_node_size                           ue(v)
    log2_trisoup_node_size                                  ue(v)
<M>     if( log2_trisoup_node_size == 0 ) {
        unique_geometry_points_flag                         <M>u(1)</M>
        inferred_direct_coding_mode_enabled_flag            <M>u(1)</M>
}</M>
``` unique_geometry_points_flag equal to 1 indicates that in all slices that refer to the current GPS, all output points have unique positions within a slice.

unique geometry_points flag equal to 0 indicates that in all slices that refer to the current GPS, two or more of the output points may have same positions within a slice. <M>When unique_geometry_points_flag is not present in the bitstream, it is inferred to be 1.</M> inferred_direct_coding_mode_enabled_flag equal to 1 indicates that direct_mode_flag may be present in the geometry node syntax.

inferred_direct_coding_mode_enabled_flag equal to 0 indicates that direct_mode_flag is not present in the geometry node syntax. <M>When inferred_direct_coding_mode_enabled_flag is not present in the bitstream, it is inferred to be 0.</M> log2_trisoup_node_size specifies the variable TrisoupNodeSize as the size of the triangle nodes as follows.

TrisoupNodeSize=1<<log2_trisoup_node_size

When log2_trisoup_node_size is equal to 0, the geometry bitstream includes only the octree coding syntax. <D>When log2_trisoup_node_size is greater than 0, it is a requirement of bitstream conformance that:

inferred_direct_coding_mode_enabled_flag must be equal to 0, and unique_geometry_points_flag must be equal to 1.</D> direct_mode_flag equal to 1 indicates that the single child node of the current node is a leaf node and contains one or more delta point coordinates. direct_mode_flag equal to 0 indicates that the single child node of the current node is an internal octree node. When not present, the value of direct_mode_flag is inferred to be 0.

Signaling of lifting_num_pred_nearest_neighbours (which is indicative of the maximum number of nearest neighbors used for prediction) and other similar syntax elements is now discussed. According to document w18887, a G-PCC encoder, such as G-PCC encoder 200, may signal lifting_num_pred_nearest_neighbours in attribute parameter set which specifies maximum nearest neighbors used for prediction (e.g., for a predicting transform and a lifting transform), which has a minimum value of 1.

```
if( LodParametersPresent) {
    lifting_num_pred_nearest_neighbours          ue(v)
``` lifting_num_pred_nearest_neighbours specifies the maximum number of nearest neighbours to be used for prediction. The value of lifting_numpred_nearest_neighbours shall be in the range of 1 to xx.

As the minimum value of the syntax is 1, G-PCC encoder may signal lifting_num_pred_nearest_neighbours_minus1 instead. The proposed syntax and semantics are shown below.

```
if( LodParametersPresent) {
    lifting_num_pred_nearest_neighbours_minus1    ue(v)
}
``` lifting_num_pred_nearest_neighbours_minus1 plus 1 specifies the maximum number of nearest neighbours to be used for prediction. The value of lifting_num_pred_nearest_neighbours shall be in the range of 1 to xx.

Therefore, in some examples, a device, such as G-PCC encoder 200 or G-PCC decoder 300, may determine a lifting syntax element, wherein a value of the lifting syntax element plus 1 specifies a maximum number of nearest neighbors to be used for prediction. The device may code the point cloud at least partially (and in some examples further) based on the prediction. In this manner, G-PCC encoder 200 may reduce the number of bits used to signal the lifting syntax element, thereby reducing signaling overhead when compared to the signaling described in document w18887.

In some examples, the device may determine a geometry slice header syntax element, wherein a value of the geometry slice header syntax element plus 1 specifies a number of points in a geometry slice. The device may determine an attribute bit depth syntax element, wherein a value of the attribute bit depth syntax element plus 1 specifies a bit depth of an attribute. The device may also determine a number of unique segments syntax element, wherein a value of the number of unique segments syntax element plus 1 specifies a number of unique segments.

In some examples, a device, such as G-PCC encoder 200 or G-PCC decoder 300, may code a syntax element (e.g., lifting numpred nearest neighbours minus1), wherein the syntax element plus 1 specifies a maximum number of nearest neighbors to be used for prediction. The coder may code a point cloud using the syntax element.

Similarly, according to the techniques of this disclosure, the coding of the following syntax elements is modified as a zero value for these syntax elements may not be desired:

1. gsh_num_points (which is indicative of the number of coded points in the point cloud in a slice) may be coded as gsh_num_points_minus1
2. sps_num_attributes (which is indicative of the number of attributes in a sequence) may be coded as sps_num_attribute_sets_minus1 (if no-attribute point cloud is to be supported by G-PCC, then this change is not appropriate and may be ignored.)
3. attribute_dimension[ ] (which is indicative of an attribute associated with the point cloud) may be coded as attribute_dimension_minus1[ ]
4. attribute_bitdepth[ ] (which is indicative of an attribute bitdepth associated with the point cloud) may be coded as attribute_bitdepth_minus1[ ] or attribute_bitdepth_minusN[ ], where N is expected to the smallest attribute bitdepth to be supported. For example, the value of N may be set to 8.
5. num_unique_segments (which is indicative of a number of unique segments in trisoup mode) may be coded as num_unique_segments_minus1
6. num_vertices (which is indicative of a number of vertices in trisoup mode) may be coded as num_vertices_minus1

```
sps_num_attribute_sets_minus1                          ue(v)
for( i = 0; i<= sps_num_attribute_sets_minus1; i++ ) {
    attribute_dimension_minus1[ i ]                    ue(v)
    attribute_instance_id[ i ]                         ue(v)
    attribute_bitdepth_minus8[ i ]                     ue(v)
    attribute_cicp_colour_primaries[ i ]               ue(v)
    attribute_cicp_transfer_characteristics[ i ]       ue(v)
    attribute_cicp_matrix_coeffs[ i ]                  ue(v)
    attribute_cicp_video_full_range_flag[ i ]          u(1)
    known_attribute_label_flag[ i ]                    u(1)
    if( known_attribute_label_flag[ i ])
        known attribute label[ i ]                     ue(v)
    else
        attribute_label_four_bytes[ i ]                u(32)
}
```

As mentioned above, rather than attribute_bitdepth_minus8 being used as shown in the table above, attribute_bitdepth_minus1 may be used.

| | Descriptor |
|---|---|
| geometry_trisoup_data( ) { | |
| num_unique_segments_minus1 | ae(v) |
| for( i = 0; i <= num_unique_segments_minus1; i++ ) | |
|     segment_indicator[ i ] | ae(v) |
| num_vertices_minus1 | ae(v) |
| for( i = 0; i <= num_vertices_minus1; i++) | |
|     vertex_position[ i ] | ae(v) |
| } | |

The semantics of the above syntax elements may also be updated appropriately, similar to lifting_numpred_nearest_neighbours.

In some scenarios, instead of G-PCC encoder 200 directly signaling the value of num_unique_segments, G-PCC encoder 200 may first downscale the value of num_unique_segments by using a ceiling function which may limit the downscaled value of the number of unique segments as such:

num_unique_segments_downscaled=Ceil (num_unique_segments/K), where K is a positive integer, which can be fixed or variable. G-PCC encoder 200 may signal num_unique_ segments_downscaled. If K is variable, G-PCC encoder 200 may also signal the value of K. For example, in G-PCC reference software a fixed value of K=8 is used. This methodology reduces the associated signaling cost, considering num_unique_segments can have very high values, and variable length coding (such as Exponential-Golomb coding) can result in too much signaling. For example, if num_unique_ segments=10002, and K=8, then num_unique_segments_dowsampled=Ceil (10002/8)=1251. Fewer bits may be needed to signal "1251" (e.g., num_unique_segments_downscaled) then "10002" (e.g., num_unique_segments). Therefore, in some examples, G-PCC encoder may signal num_unique_segments_downscaled (e.g., 1251) and G-PCC decoder may parse the signaled num_unique_segments_downscaled (e.g., 1251) and calculate num_unique_segments (e.g., 10002) by multiplying num_unique_segments_downscaled (e.g., 1251) by K (e.g., 8). In this scenario, num_unique_segments_downscaled may always have a minimum value of 1, hence num_unique_segments_downscaled_minus1 may be signaled instead. In the above example, G-PCC encoder 200 may signal 1250 (instead of 1251).

Signaling of lifting_sampling_period[ ] (which is indicative of the sampling period for the level of detail idx) is now discussed. For level of detail (LoD) generation, there are two ways of generation set forth in document w18887: 1) distance-based, and 2) regular sampling-based. For regular sampling-based generation, G-PCC encoder 200 may signal a sampling factor for each LoD. The syntax and semantics are shown below.

```
if ( ! lifting_scalability_enabled_flag ) {
    lifting_lod_regular_sampling_enabled_flag              u(1)
    for( idx = 0; idx <= num_detail_levels_minus1; idx++ )
    {
        if (lifting_lod_regular_sampling_enabled_flag)
<E>         lifting_sampling_period[ idx ]</E>             ue(v)
        else
            lifting_sampling_distance_squared[ idx ]       <M>ue(v)
                                                           </M>
    }
``` lifting_sampling_period[idx] specifies the sampling period for the level of detail idx. The value of lifting_sampling_period[ ] shall be in the range of 0 to <M>xx</M>.

However, by definition, LoD idx is generated by subsampling LoD (idx+1), e.g., keeping one point out of every lifting_sampling_period[idx]. Therefore, lifting_sampling_period[idx] equal to zero may not be possible, even a value of 1 does not indicate subsampling. Thus, the lifting sampling period should have a minimum value of 2. Thus, G-PCC encoder 200 may signal lifting_sampling_period_minus2[idx] instead. The proposed syntax and semantics are shown below.

```
if ( ! lifting_scalability_enabled_flag) {
    lifting_lod_regular_sampling_enabled_flag              u(1)
    for( idx = 0; idx <= num_detail_levels_minus1;
    idx++ ) {
        if ( lifting_lod_regular_sampling_enabled_flag )
<E>                                                        ue(v)
    lifting_sampling_period<M>_minus2</M>[ idx ]</E>
        else
            lifting_sampling_distance_squared[ idx ]       ue(v)
    }
``` lifting_sampling_period<M>_minus2[idx] plus 2</M> specifies the sampling period for the level of detail idx. The value of lifting_sampling_period[idx] shall be in the range of <M>2 to xx</M>.

Therefore, in some examples a device, such as G-PCC encoder 200 or G-PCC decoder 300, may determine a value of a sampling period syntax element, the value of the sampling period syntax element being indicative of a sampling period for a level of detail index. The device may code the point cloud at least partially (and in some examples, further) based on the sampling period. In some examples, the value of the sampling period syntax element plus 2 specifies the sampling period for the level of detail index. In this manner, G-PCC encoder 200 may reduce the number of bits used to signal the sampling period syntax element, thereby reducing signaling overhead when compared to the signaling described in document w18887.

In some examples, a device, such as G-PCC encoder 200 or G-PCC decoder 300, may code a syntax element, wherein the syntax element plus 2 specifies a sampling period for a level of detail index; and code a point cloud using the syntax element.

Moreover, in some cases, a constant sampling factor for all the LoD layers may be sufficient. For example, according to document w18887, TMC13 settings use a sampling period of 4 for all the layers. Thus, according to the techniques of this disclosure, G-PCC encoder 200 may signal a flag indicating whether sampling factor is the same for all the layers. The corresponding syntax and semantics are as follows.

```
        if ( ! lifting_scalability_enabled_flag) {
            lifting_lod_regular_sampling_enabled_flag           u(1)
<M>     if( lifting_lod_regular_sampling_enabled_flag
)</M>
<M>                                                             <M>u(1) </M>
            lifting_lod_constant_sampling_period_flag</M>
<M>             if( lifting_ lod_constant_sampling_period_flag )
</M>
<M>                                                             <M>u(1) </M>
        lifting_constant_sampling_period_minus2</M>
            for( idx = 0; idx <= num_detail_levels_minus1; idx++ )
{
                if ( lifting_lod_regular_sampling_enabled_flag &&
                    <M>!
lifting_lod_constant_sampling_period_flag</M> )
                    lifting_sampling_period<M>_minus2</M>      <M>ue(v)
[ idx ]                                                         </M>
                else
                    lifting_sampling_distance_squared[ idx ]    <M>ue(v)
                                                                </M>
        }
```

<M>lifting_lod_constant_sampling_period_flag equal to 1 specifies the sampling period for all the levels of detail are the same.

lifting_lod_constant_sampling_period_flag equal to 0 indicates the sampling period of different LoD layers are different. When lifting_lod_constant_sampling_period_flag is not present in the bitstream, it is inferred to be _0.</M>

<M>lifting_constant_sampling_period_minus2 plus 2 specifies the constant sampling period to be used for regular sampling strategy of LoD generation when lifting_lod_constant_sampling_period_flag is equal to 1. </M> lifting_sampling_period_minus2[idx] plus 2 specifies the sampling period for the level of detail idx. The value of lifting_sampling_period_minus2[idx] shall be in the range of 0 to xx. <M>When lifting_sampling_period_minus2[idx] is not present in the bitstream, it is inferred to be equal to lifting_constant_sampling_period_minus2. </M>

Thus, a device, such as G-PCC encoder 200 or G-PCC decoder 300, may code a first syntax element (e.g., lifting_lod_constant_sampling_period_flag), wherein the first syntax element equal to 1 specifies a sampling period for all levels of detail (LoD) are the same, wherein the first syntax element equal to 0 specifies that sampling periods for different LoD layers are different; and code a point cloud using the first syntax element. Furthermore, G-PCC encoder 200 or G-PCC decoder 300 may code a second syntax element (e.g., lifting_constant_sampling_period_minus2), wherein the second syntax element plus 2 specifies a constant sampling period to be used for regular sampling strategy of Levels of Detail (LoD) generating when the first syntax element is equal to 1. G-PCC encoder 200 or G-PCC decoder 300 may determine a value of a third syntax (e.g., lifting_sample_period_minus2) element plus 2 specifies the sampling period for a LoD index, wherein when the third syntax element is not present in a bitstream, a decoder infers the value of the third syntax element to be equal to a value of the second syntax element.

Signaling of lifting_sampling_distance_squared[ ] (which is indicative of the square of the sampling distance for the level of detail idx) is now discussed. For distance-based LoD generation, G-PCC encoder 200 may signal the distance used for each LoD layer in the bitstream as shown below in the corresponding syntax and semantics.

```
if (! lifting_scalability_enabled_flag ) {
    lifting_lod_regular_sampling_enabled_flag              u(1)
    for( idx = 0; idx <= num_detail_levels_minus1;
    idx++ ) {
        if (lifting_lod_regular_sampling_enabled_flag )
            lifting_sampling_period[ idx ]                 ue(v)
        else
<E>             lifting_sampling_distance_squared[         ue(v)
                idx ]</E>
    }
```

However, these distances often increase exponentially with LoD level, so according to the techniques of this disclosure, G-PCC encoder 200 and/or G-PCC decode r300 may determine:

```
lifting_sampling_distance_squared[ idx ] =
    (lifting_sampling_distance_squared_scale_minus1[idx-l] + 1) *
    lifting_sampling_distance_squared[ idx -1] +
        lifting_sampling_distance_squared_offset[ idx -1]
```

Thus, according to the techniques of this disclosure, G-PCC encoder 200 may signal the lifting_sampling_distance_squared_scale_minus1[idx−1] and lifting_sampling_distance_squared_offset[idx−1], as shown below in the proposed syntax and semantics.

```
        if (! lifting_scalability_enabled_flag ) {
        lifting_lod_regular_sampling_enabled_flag          u(1)
        for( idx = 0; idx <= num_detail_levels_minus1; idx++ )
{
            if (lifting_lod_regular_sampling_enabled_flag)
                lifting_sampling_period[ idx ]             ue(v)
            else {
<M>                                                        <M>ue(v)</M>
    lifting_sampling_distance_squared_scale_minus1[ idx ]
</M>
<M>                 if( idx != 0 ) </M>
<M>                                                        <M>ue(v)</M>
    lifting_sampling_distance_squared_offset[ idx ] </M>
<M>             }</M>
        }
```

<D>lifting_sampling_distance_squared[idx] specifies the square of the sampling distance for the level of detail idx. The value of lifting_sampling_distance_squared[ ] shall be in the range of 0 to xx.</D>
<M>lifting_sampling_distance_squared_scale_minus1 [idx] plus 1 specifies the scaling factor for the derivation of the square of the sampling distance for the level of detail idx. The value of lifting_sampling_distance_squared_scale_minus1[idx] shall be in the range of 0 to xx. When lifting_sampling_distance_squared_scale_minus1[idx] is not present in the bitstream, it is inferred to be 0.</M>
<M>lifting_sampling_distance_squared_offset[idx] specifies the offset for the derivation of the square of the sampling distance for the level of detail idx. The value of lifting_sampling_distance_squared_offset[idx] shall be in the range of 0 to xx. When lifting sampling distance squared offset[idx] is not present in the bitstream, it is inferred to be 0.</M>

```
<M>The sampling distance for the level of detail idx,
lifting_sampling_distance_squared[idx] for idx =
0...num_detail_level_minus1,
inclusive, are derived as follows:
    lifting_sampling_distance_squared[0] =
    lifting_sampling_distance_squared_scale_minus1[0] + 1
    for( idx = 1; idx <= num_detail_levels_minus1; idx++ ) {
        lifting_sampling_distance_squared[ idx ] =
            (lifting_sampling_distance_squared_scale_minus1[idx] +
            1) *
                lifting_sampling_distance_squared[ idx −1] +
            lifting_sampling_distance_squared_offset[ idx]
    }</M>
```

Thus, a device, such as G-PCC encoder 200 or G-PCC decoder 300, may determine a value of a first syntax element (e.g., lifting_sampling_distance_squared_scale_minus1), wherein the value of the first syntax element plus 1 specifies a scaling factor for a derivation of a square of a sampling distance for a Level of Detail (LoD) index; determine a value of a second syntax element (e.g., lifting_sampling_distance_squared_offset), wherein the value of the second syntax element specifies an offset for the derivation of the square of the sampling distance for the LoD index; determine the sampling distance for the LoD index based on the value of the first syntax element and the value of the second syntax element; and code a point cloud based on the sampling distance of the LoD index.

Signaling of sps_source_scale_factor (which is indicative of a scaling factor of the source point cloud) is now discussed. The scaling factor may be used to scale point positions in a physical dimension before displaying the point cloud. According to document w18887, a G-PCC encoder, such as G-PCC encoder 200, may signal sps_source_scale_factor as a floating point number with 32-bit precision, e.g., u(32).

| sps_source_scale_factor [Ed. TMC13 v7 uses float, but integer is preferred.] | u(32) |
|---|---| sps_source_scale_factor indicates the scale factor of the source point cloud.

However, instead of a floating point representation, a rational representation may be preferred, e.g., a numerator and a denominator each may be coded as an integer. Accordingly, G-PCC encoder 200 or G-PCC decoder 300 may code the numerator and denominator. However, for a valid rational representation (excluding 0 or undefined), neither the numerator nor the denominator can be zero. Thus, according to the techniques of this disclosure, G-PCC encoder 200 may signal <M>sps_source_scale_factor_numerator_minus1</M> and <M>sps_source_scale_factor_denominator_minus1</M> instead as shown below.

| <M> sps_source_scale_factor_numerator_minus1</M> | <M>ue(v)</M> |
|---|---|
| </M> sps_source_scale_factor_denominator_minus1</M> | <M>ue(v)</M> |

An advantage of this approach is the scenario where a higher precision (of the fractional value) is required, more bits can be spent for the coding of numerator and denominator. On the other hand, when a coarse precision is sufficient, less bits may be used. This approach is more scalable compared to the approach in document w18887 which uses constant 32-bit representation irrespective of the required precision.

Moreover, it may be useful to have the concept of point-cloud usability information (PCUI), which may mainly deal with the parameters which are not part of the decoding process, but can be useful for displaying purposes (e.g., similar to video usability information (VUI) in HEVC or Versatile Video Coding (VVC) of the Joint Video Experts Team (WET) of ITU-T SG 16 WP3 and ISO/IEC JTC 1/SC 29/WG 11), which may be signaled at the end of an SPS. In such a scenario, the abovementioned syntax e.g., sps_source_scale_factor or sps_source_scale_factor_numerator_minus1 and sps_source_scale_factor_denominator_minus1 may be moved to PCUI.

Therefore, in some examples, a device, such as G-PCC encoder 200 or G-PCC decoder 300, may determine a value of a numerator syntax element, the value of the numerator syntax element being indicative of a numerator of a scale factor of the point cloud; determine a value of a denominator syntax element, the value of the denominator syntax element being indicative of a denominator of the scale factor of the point cloud; and code the point cloud at least in part (and in some examples, further) based on the scale factor of the point cloud. In some examples, the value of the numerator syntax element plus one specifies the numerator of the scale factor of the point cloud. In some examples, the value of the denominator syntax element plus one specifies the denominator of the scale factor of the point cloud. In this manner, G-PCC encoder 200 may reduce the number of bits used to signal the scale factor, thereby reducing signaling overhead when compared to the signaling described in document w18887.

In some examples, a device, such as G-PCC encoder 200 or G-PCC decoder 300, may determine a value of a first syntax element, the value of the first syntax element indicating a numerator of a scale factor of a point cloud; determine a value of a second syntax element, the value of the second syntax element indicating a denominator of the scale factor of the point cloud; and code the point cloud using the scale factor of the point cloud.

The coding of various parameter set IDs is now discussed. According to document w18887, a G-PCC encoder, such as G-PCC encoder 200, may signal various parameter set IDs such as SPS ID, GPS ID, and APS ID using variable length coding. However, G-PCC decoder 300 may need to parse these IDs to decode a slice.

Figure 4:
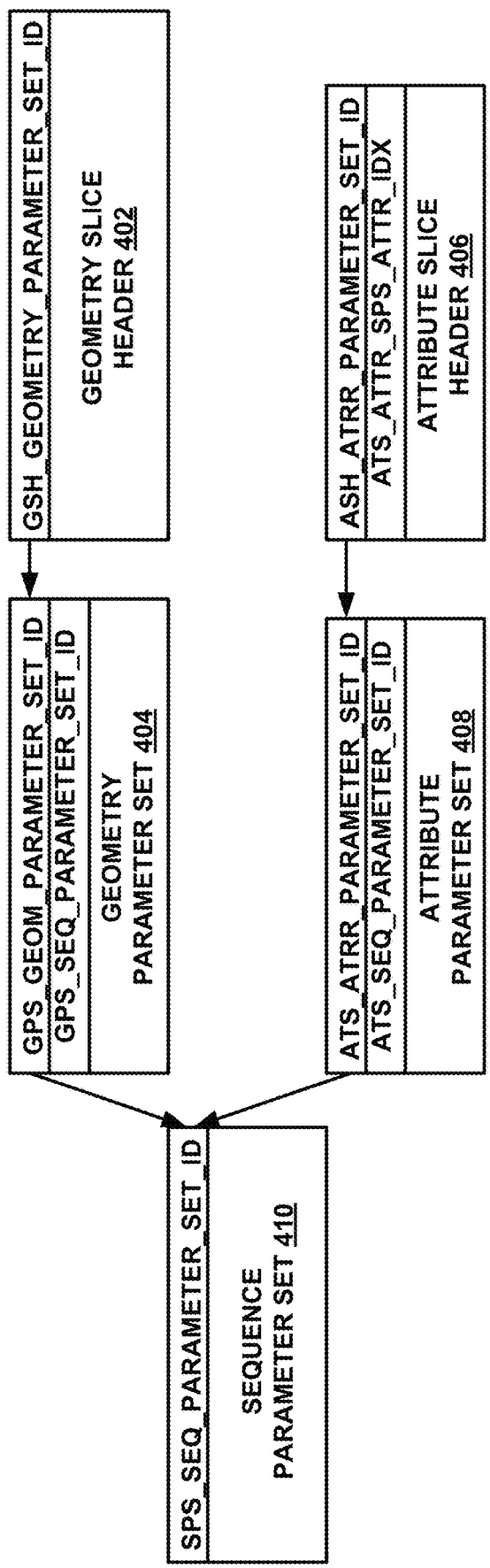
FIG. 4 is a conceptual diagram illustrating a relationship between a sequence parameter set, a geometry parameter set, a geometry slice header, an attribute parameter set, and an attribute slice header.

FIG. 4 is a conceptual diagram illustrating a relationship between a sequence parameter set, a geometry parameter set, a geometry slice header, an attribute parameter set, and an attribute slice header. G-PCC decoder 300 may use geometry slice header (GSH) 402 to find the associated GPS, e.g., GPS 404, for a geometry slice by referring to the GPS ID. Using GPS 404, G-PCC decoder 300 may find the associated SPS, e.g., SPS 410 by referring to the SPS ID, as shown in the example of FIG. 4. Similarly, G-PCC decoder 300 may use attribute slice header 406 to find the associated APS, e.g., APS 408, by referring to the APS ID. Using APS 408, G-PCC decoder 300 may find the associated SPS, SPS 410 by referring to the SPS ID.

However, due to the fact that SPS ID, GPS ID, and APS ID, can each have a value of 0 to 15, inclusive, indicating the range to be a power of 2, and for the ease of parsing such IDs, according to the techniques of this disclosure, G-PCC encoder 200 may encode these IDs using a fixed length coding, e.g., u(4) (or 4 bits) for SPS ID, for GPS ID, and/or for APS ID. The syntax modification is shown below.

|  | Descriptor |
|---|---|
| sps_source_scale_factor [Ed. TMC13 v7 uses float, but integer is preferred.] | u(32) |
| sps_seq_parameter_set_id | <M>u(4)</M> |
| sps_num_attribute_sets | ue(v) |

|  | Descriptor |
|---|---|
| geometry_parameter_set( ) { |  |
| gps_geom_parameter_set_id | <M>u(4)</M> |
| gps_seq_parameter_set_id | <M>u(4)</M> |

|  | Descriptor |
|---|---|
| attribute_parameter_set( ) { |  |
| aps_attr_parameter_set_id | <M>u(4)</M> |
| aps_seq_parameter_set_id | <M>u(4)</M> |

|  | Descriptor |
|---|---|
| geometry_slice_header( ) { |  |
| gsh_geometry_parameter_set_id | <M>u(4)</M> |
| attribute_slice_header( ) { |  |
| ash_attr_parameter_set_id | <M>u(4)</M> |

Therefore, in some examples, a device, such as G-PCC encoder 200 or G-PCC decoder 300, may determine a parameter set identifier (ID), wherein the parameter set ID is coded using a fixed length. In some examples, the fixed length is 4 bits. In some examples, the parameter set ID identifies a parameter set. The parameter set may include one of a sequence parameter set, a geometry parameter set, or an attribute parameter set. In this manner, G-PCC encoder 200 may reduce the number of bits used to signal a parameter set ID, thereby reducing signaling overhead when compared to the signaling described in document w18887.

In some examples, a device, such as G-PCC encoder 200 or G-PCC decoder 300, may use a fixed-length value to indicate a syntax element, wherein the syntax element is one of a sequence parameter set (SPS) identifier, a geometry parameter set identifier, an attribute parameter set identifier, a geometry slice header identifier, or an attribute slice header identifier; and code a bitstream that comprises an encoded representation of a point cloud, wherein the bitstream includes at least one of an SPS identified by the SPS identifier, a geometry parameter set identified by the geometry parameter set identifier, an attribute parameter set identified by the attribute parameter set identifier, a geometry slice header identified by the geometry slice header identifier, or an attribute slice header identified by the attribute slice header identifier.

Moreover, according to the techniques of this disclosure, G-PCC encoder 200 may signal the sps_seq_parameter_set_id (which is indicative of an identifier for the SPS) to the very beginning of the SPS. Alternatively, G-PCC encoder 200 may signal sps_seq_parameter_set_id in the SPS at least before syntax elements that require variable length parsing (e.g., sps_bounding_box_present_flag (which is indicative of whether a bounding box is present in the sequence)). This may facilitate G-PCC decoder 300 quickly parsing sps_seq_parameter_set_id. Thus, one of the four possible examples may be employed, as shown below. Any of Examples 1-4 may reduce the complexity of the parsing of sps_seq_parameter_set_id for G-PCC decoder 300.

EXAMPLE 1

|  | Descriptor |
|---|---|
| seq_parameter_set( ) { |  |
| <M> sps_seq_parameter_set_id</M> | <M>u(4)</M> |
| reserved_profile_compatibility_23bits | u(23) |
| [Ed. assign bits from this when there is a profile defined] |  |
| unique point positions constraint flag | u(1) |
| level_idc | u(8) |
| sps_bounding_box_present_flag | u(1) |
| if( sps_bounding_box_present_flag ) { |  |
| sps_bounding_box_offset_x | se(v) |
| sps_bounding_box_offset_y | se(v) |
| sps_bounding_box_offset_z | se(v) |
| sps_bounding_box_scale_factor | ue(v) |
| sps_bounding_box_size_width | ue(v) |
| sps_bounding_box_size_height | ue(v) |
| sps_bounding_box_size_depth | ue(v) |
| } |  |
| sps_source_scale_factor [Ed. TMC13 v7 uses float, but integer is preferred.] | u(32) |
| <D> sps_seq_parameter_set_id</D> | <D>u(4)</D> |

EXAMPLE 2

| | Descriptor |
|---|---|
| seq_parameter_set( ) { | |
|    reserved_profile_compatibility_23bits | u(23) |
| [Ed. assign bits from this when there is a profile defined] | |
|    <M> sps_seq_parameter_set_id</M> | <M>u(4)</M> |
|    unique_point_positions_constraint_flag | u(1) |
|    level_idc | u(8) |
|    sps_bounding_box_present_flag | u(1) |
|    if( sps_bounding_box_present_flag ) { | |
|       sps_bounding_box_offset_x | se(v) |
|       sps_bounding_box_offset_y | se(v) |
|       sps_bounding_box_offset_z | se(v) |
|       sps_bounding_box_scale_factor | ue(v) |
|       sps_bounding_box_size_width | ue(v) |
|       sps_bounding_box_size_height | ue(v) |
|       sps_bounding_box_size_depth | ue(v) |
|    } | |
|    sps_source_scale_factor [Ed. TMC13 v7 uses float, but integer is preferred.] | u(32) |
|    <D> sps_seq_parameter_set_id</D> | <D>u(4)</D> |

EXAMPLE 3

| | Descriptor |
|---|---|
| seq_parameter_set( ) { | |
|    reserved_profile_compatibility_23bits | u(23) |
| [Ed. assign bits from this when there is a profile defined] | |
|    unique_point_positions_constraint_flag | u(1) |
|    <M> sps_seq_parameter_set_id</M> | <M>u(4)</M> |
|    level_idc | u(8) |
|    sps_bounding_box_present_flag | u(1) |
|    if( sps_bounding_box_present_flag ) { | |
|       sps_bounding_box_offset_x | se(v) |
|       sps_bounding_box_offset_y | se(v) |
|       sps_bounding_box_offset_z | se(v) |
|       sps_bounding_box_scale_factor | ue(v) |
|       sps_bounding_box_size_width | ue(v) |
|       sps_bounding_box_size_height | ue(v) |
|       sps_bounding_box_size_depth | ue(v) |
|    } | |
|    sps_source_scale_factor [Ed. TMC13 v7 uses float, but integer is preferred.] | u(32) |
|    <D> sps_seq_parameter_set_id</D> | <D>u(4)</D> |

EXAMPLE 4

| | Descriptor |
|---|---|
| seq_parameter_set( ) { | |
|    reserved_profile_compatibility_23bits | u(23) |
| [Ed. assign bits from this when there is a profile defined] | |
|    unique_point_positions_constraint_flag | u(1) |
|    level_idc | u(8) |
|    <M> sps_seq_parameter_set_id</M> | <M>u(4)</M> |
|    sps_bounding_box_present_flag | u(1) |
|    if( sps_bounding_box_present_flag ) { | |
|       sps_bounding_box_offset_x | se(v) |
|       sps_bounding_box_offset_y | se(v) |
|       sps_bounding_box_offset_z | se(v) |
|       sps_bounding_box_scale_factor | ue(v) |
|       sps_bounding_box_size_width | ue(v) |
|       sps_bounding_box_size_height | ue(v) |
|       sps_bounding_box_size_depth | ue(v) |

-continued

| | Descriptor |
|---|---|
|    } | |
|    sps_source_scale_factor [Ed. TMC13 v7 uses float, but integer is preferred.] | u(32) |
|    <D> sps_seq_parameter_set_id</D> | <D>u(4)</D> |

Therefore, in some examples, the parameter set (indicated by the parameter set ID) is the sequence parameter set and the parameter set ID follows a syntax element indicative of a level of an upper limit associated with point cloud data (such as a number of allowed points in a point cloud frame or slice, the bounding box size, the maximum octree root-node dimension, etc.) and precedes a syntax element indicative of whether a bounding box is present in the sequence parameter set. In this manner, G-PCC encoder 200 may place the parameter set ID in a position in a sequence parameter set that may reduce decoding latency for G-PCC decoder 300.

Coding syntax elements based on the number of dimensions of the attribute is now discussed. Attributes may be of different types and each attribute may have one or more dimensions. For example, a color attribute may have three dimensions, whereas a frame_idx attribute may only have one dimension. The frame_idx attribute may indicate a frame number of a point cloud frame. However, some syntax elements in the G-PCC syntax structure are signaled irrespective of the number of dimensions of the associated attribute, particularly those associated with chroma component/dimension: aps_attr_chroma_qp_offset, ash_attr_qp_delta_chroma, and ash_attr_layer_qp_delta_chroma [i]. According to the techniques of this disclosure, a G-PCC coder, such as G-PCC encoder 200 may signal these syntax elements with an attribute_dimension[i] that specifies the number of dimensions associated with the i-th attribute. The changes to the syntax and semantics in document w18887 are as follows:

| | Descriptor |
|---|---|
| attribute_slice_header( ) { | |
|    ash_attr_parameter_set_id | ue(v) |
|    ash_attr_sps_attr_idx | ue(v) |
|    ash_attr_geom_slice_id | ue(v) |
|    if ( aps_slice_qp_delta_present_flag ) { | |
|       ash_attr_qp_delta_luma | se(v) |
|    <M> if( attribute_dimension[ ash_attr_sps_attr_idx ] > 1 ) </M> | |
|          ash_attr_qp_delta_chroma | se(v) |
|    } | |
|    ash_attr_layer_qp_delta_present_flag | u(1) |
|    if ( ash_attr_layer_qp_delta_present_flag ) { | |
|       numLayers = aps.attr_encoding = = 1 ? aps.raht_depth + 1 : aps.num_detail_levels + 1 | |
|       for( i = 0; i < numLayers; i++ ){ | |
|          ash_attr_layer_qp_delta_luma[i] | se(v) |
|    <M> if( attribute_dimension[ ash_attr_sps_attr_idx ] > 1 )</M> | |
|          ash_attr_layer_qp_delta_chroma[i] | se(v) |
|       } | |
|    } | | ash_attr_qp_delta_luma specifies the luma delta qp from the initial slice qp in the active attribute parameter set. When ash_attr_qp_delta_luma is not signalled, the value of ash_attr_qp_delta_luma is inferred to be 0.

ash_attr_qp_delta_chroma specifies the chroma delta qp from the initial slice qp in the active attribute parameter set. When ash_attr_qp_delta_chroma is not signalled, the value of ash_attr_qp_delta_chroma is inferred to be 0.

The variables InitialSliceQpY and InitialSliceQpC are derived as follows:

InitialSliceQpY=aps_attrattr_initial_qp+ash_attr_qp_delta_luma

InitialSliceQpC=aps_attrattr_initial_qp+aps_attr_chroma_qp_offset+ash_attr_qp_delta_chroma ash_attr_layer_qp_delta_luma specifies the luma delta qp from the InitialSliceQpY in each layer. When ash_attr_layer_qp_delta_luma is not signalled, the value of ash_attr_layer_qp_delta_luma of all layers are inferred to be 0.

ash_attr_layer_qp_delta_chroma specifies the chroma delta qp from the InitialSliceQpC in each layer. When ash_attr_layer_qp_delta_chroma is not signalled, the value of ash_attr_layer_qp_delta_chroma of all layers are inferred to be 0.

The variables SliceQpY[i] and SliceQpC[i] with i=0 . . . num_layer−1 are derived as follows:

```
for (i = 0; i < num_layer; i++) {
    SliceQpY[ i ] = InitialSliceQpY +
    ash_attr_layer_qp_delta_luma[ i ]
    SliceQpC[ i ] = InitialSliceQpC +
    ash_attr_layer_qp_delta_chroma[ i ]
}
```

A delta qp is a difference between an initial qp (signaled in an attribute parameter set (APS)) and a qp to be used for a current sample.

Therefore, a device, such as G-PCC encoder 200 or G-PCC decoder 300 may determine a value of an index entry associated with a number of dimensions of a current attribute; determine whether the value of the index entry is greater than 1; and based on the value of the index entry not being greater than 1, refrain from coding at least one of a first chroma delta qp syntax element indicative of the chroma delta qp from an initial slice qp in an active attribute parameter set, or a second chroma delta qp syntax element indicative of the chroma delta qp from the initial slice qp chroma in each layer. Coding the point cloud may be based at least in part (and in some examples, further) based on the number of dimensions of the current attribute. In this manner, G-PCC encoder 200 may reduce signaling overhead when compared to document w18887.

G-PCC encoder 200 may signal the syntax element aps_attr_chroma_qp_offset in the attribute parameter set, where the number of dimensions associated with the attribute is unknown. Therefore, this disclosure does not address changing the coding of that syntax element.

Similarly, G-PCC encoder 200 may signal the information regarding the bit depth and secondary bit depth, targeted respectively for the coding of luma and chroma components in the SPS. According to the techniques of this disclosure, G-PCC encoder 200 may signal the secondary bit depth information when an attribute dimension is greater than 1.

```
for( i = 0; i< sps_num_attribute_sets; i++ ) {
    attribute_dimension[ i ]                          ue(v)
    attribute_instance_id[ i ]                        ue(v)
    attribute_bitdepth[ i ]                           ue(v)
<M>     if(attribute_dimension[ i ] > 1) </M>
<E>        attribute_secondary_bitdepth[ i ]</E>  <E>ue(v)</E>
    attribute_cicp_colour_primaries[ i ]              ue(v)
    attribute_cicp_transfer_characteristics[ i ]      ue(v)
    attribute_cicp_matrix_coeffs[ i ]                 ue(v)
    attribute_cicp_video_full_range_flag[ i ]         u(1)
```

-continued

```
    known_attribute_label_flag[ i ]                   u(1)
    if( known_attribute_label_flag[ i ] )
        known_attribute_label[ i ]                    ue(v)
        else
        attribute_label_four_bytes[ i ]               u(32)
}
```

Thus, in some examples, a device, such as G-PCC encoder 200 or G-PCC decoder 300, may determine, based on an index of a current attribute dimension, whether to code a syntax element, wherein the syntax element indicates one of: a luma delta quantization parameter (QP) from an initial slice QP in an active attribute parameter set, a chroma delta QP from the initial slice QP in the active attribute parameter set, or an indication of a secondary bit depth; and code a point cloud based on the syntax element.

Signaling of number of points in a point cloud is now discussed. In a recent comment from a national body, it was suggested that signaling the syntax element gsh_num_points which indicates the number of coded points in the point cloud in a slice is redundant because the number of points in the point cloud will be computed by the decoder when decoding the geometry of the point cloud.

Although the number of points is not necessary for decoding the point cloud, the syntax element is helpful in indicating the complexity or the amount of resources required to decode the point cloud. Decoders, such as G-PCC decoder 300 may be able to apportion resources using the number of coded points in the point cloud. Decoders, such as G-PCC decoder 300 may also be able to negotiate for point cloud bitstreams based on the number of points that are coded in the bitstream. For example, a decoder may negotiate for a number of layers of point cloud data to be decoded based on available decoding resources, such as processing power, etc. Therefore, it may be useful to indicate this information in the bitstream. A G-PCC decoder deriving the number of coded points in the point cloud may not be feasible as the derivation may require decoding the entire geometry of the point cloud.

Therefore, according to the techniques of this disclosure G-PCC encoder 200 may signal the number of coded points in the point cloud in the slice header (as signaled in document w18887 as gsh_num_points) or at a higher level, which may be useful for G-PCC decoder 300.

For information that are not explicitly needed for the decoding of the point cloud bitstream, but may be useful for decoders in typical application scenarios, a separate syntax structure or a syntax sub-structure within an SPS (e.g., a point cloud usability information similar to video usability information in video) may be defined. Syntax elements such as gsh_num_points or sps_source_scale_factor (or the proposed variants of these syntax elements in other parts of this disclosure) may be signaled in this new structure or sub-structure.

Furthermore, in some situations the point cloud may be coded in a scalable fashion with levels of detail. The number of points in increasing levels of detail may increase and a decoder may be interested in knowing the number of points associated with each level of detail before determining which level(s) to decode. Therefore, G-PCC 200 may signal the number of points in each level of detail as follows.

Therefore, in some examples, a device, such as G-PCC encoder 200 or G-PCC decoder 300, may determine a level of detail syntax element indicative of a number of points associated with a level of detail. The device may code the point cloud at least in part (and in some examples, further) based on the number of points associated with the level of detail. In this manner, G-PCC decoder 300 may be enabled to determine a complexity or an amount of resources required to decode the point cloud and thereby apportion resources using the number of coded points in the point cloud.

Moreover, in some examples, the calculation of exact number of points in a point cloud may not be necessary and it may be sufficient to signal an upper bound on the number of points for G-PCC decoder 300 resource allocation, G-PCC encoder 200 may instead signal the maximum number of points. This may also reduce the burden on G-PCC encoder 200 to make a precise estimation of number of points, which may delay the generation of the syntax structure until the end of encoding. For such use cases, other aspects such as alignment of LoD generation with the octree structure is assumed.

present in the syntax structure, a third syntax element, wherein the third syntax element plus 1 specifies a number of levels of detail for which the number of points in each LoD is signaled, or a fourth syntax element, wherein the fourth syntax element plus 1 specifies a maximum number of points in one of the levels of detail; and code a point cloud based on the syntax structure.

In some examples, the value of aaa_num_lods_minus1 plus 1 may be constrained to be to the number of LoDs in the frame.

In some examples, G-PCC encoder 200 may signal the exact number of points in a points cloud or a level of detail instead of signaling a maximum number of points.

G-PCC encoder 200 may signal one or more syntax elements specified above in the bitstream as part of a parameter set (Geometry parameter set, attribute parameter set), or in the geometry or attribute payload, or in SEI messages.

|  | Descriptor |
|---|---|
| syntax_structure( ) | |
| ... | |
| <M> aaa_max_num_points_minus1</M> | <M>ue(v) </M> |
| <M> aaa_lod_points_present_flag</M> | <M>ue(v) </M> |
| <M> if( gsh_lod_points_present_flag ) {</M> | |
| <M>     aaa_num_lods_minus1</M> | <M>ue(v) </M> |
| <M>     for( i = 0; i <= aaa_num_lods_minus1; i++ ) </M> | |
| <M>         aaa_max_num_points_in_lod_minus1[ i ] </M> | <M>ue(v) </M> |
| <M> }</M> | |

[Ed. The prefix "aaa_" in the above table to be replaced based on the syntax structure that these syntax elements would be present.]

aaa_max_num_points_minus1 plus 1 specifies the maximum number of points in the point cloud.

aaa_lod_points_present_flag equal to 1 specifies that the number of points in each level of detail is present in the syntax structure. aaa_lod_points_present_flag equal to 0 specifies that the number of points in each level of detail is not signaled.

aaa_num_lods_minus1 plus 1 specifies the number of levels of detail for which the number of points in each LoD is signaled.

aaa_max_num_points_in_lod_minus1[i] plus 1 specifies the maximum number of points in the i-the LoD.

It is requirement of conformance that when aaa_lod_points_present_flag is equal to 1 the sum of (aaa_max_num_points_in_lod_minus1[i]+1) for in range of 0 to aaa_num_lods_minus1, inclusive, shall be less than or equal to (aaa_max_num_points_minus1+1).

It is also a requirement of conformance that the aaa_max_num_points_in_lod_minus1[i], when present, shall be greater than or equal to the number of points decoded for the level of detail in the decoder. [Ed. To be replaced by the NumPoint or equivalent variable that is used to derive the number of points for a particular level of detail.]

Thus, in some examples, a device, such as G-PCC encoder 200 or G-PCC decoder 300, may code a syntax structure that comprises one or more of: a first syntax element, wherein the first syntax element plus 1 specifies a maximum number of points in a point cloud, a second syntax element, wherein the second syntax element specifies whether a number of points in each level of detail (LoD) is When a point cloud contains multiple frames, one of more of the following may apply:
1. In some examples, G-PCC encoder 200 may signal the number of points signaled per-LOD in the Attribute parameter set; and the total number of points (aaa_num_points_minus1) signaled (e.g., by G-PCC encoder 200) may apply to the number of points in each frame, or a maximum number of points in each frame of the point cloud.
2. In some examples, G-PCC encoder 200 may signal the syntax structure with each frame (e.g., as part of the parameter set, payload or SEI message).
3. In some examples, the number of points in point cloud/LoD applies to all frames; the number of LoD information (aaa_num_lods_minus1) may not be equal to the number of LoDs in the frame. When the number of LoDs in a frame is more than the number of LoD information, G-PCC decoder 300 may infer that no information on the number of LoDs for those points is indicated (or infer a default value). When the number of LoDs in a frame is less than the number of LoD information, G-PCC decoder 300 may ignore the number of points of the additional LoD information not present in the frame.
4. In some examples, G-PCC encoder 200 may update this syntax structure and signal the updated syntax structure when the number of points for a frame or per LoD changes.
5. In some examples, G-PCC encoder 200 may signal other characteristics of the point cloud (other than the number of points) per frame, or per layer, or per LoD.

Figure 5:
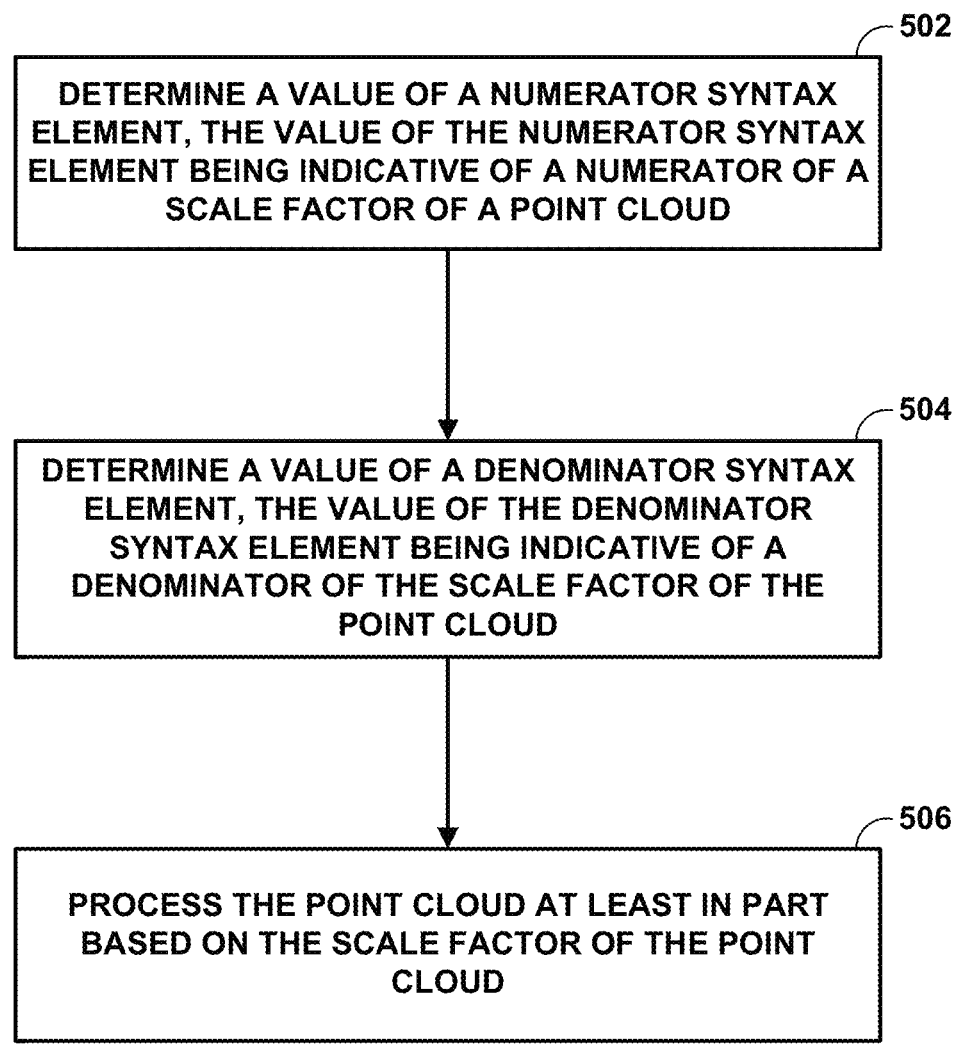
FIG. 5 is a flowchart illustrating example signaling techniques according to this disclosure.

FIG. 5 is a flowchart illustrating example signaling techniques according to this disclosure. A device may determine a value of a numerator syntax element, the value of the numerator syntax element being indicative of a numerator of a scale factor of the point cloud (502). For example, one or more processors of G-PCC encoder 200 may determine a rational representation of the scale factor of the point cloud to include a numerator and may determine the value of the numerator syntax element based on the numerator. G-PCC encoder 200 may signal the numerator syntax element in a bitstream and one or more processors of G-PCC decoder 300 may parse the numerator syntax element from the bitstream to determine the value of the numerator syntax element.

A device may determine a value of a denominator syntax element, the value of the denominator syntax element being indicative of a denominator of the scale factor of the point cloud (504). For example, one or more processors of G-PCC encoder 200 may determine a rational representation of the scale factor of the point cloud to include a denominator and may determine the value of the denominator syntax element based on the denominator. G-PCC encoder 200 may signal the denominator syntax element in the bitstream and one or more processors of G-PCC decoder 300 may parse the denominator syntax element from the bitstream to determine the value of the denominator syntax element. A device may process the point cloud at least in part based on the scale factor of the point cloud (506). For example, G-PCC encoder 200 may process the point cloud at least in part based on the scale factor of the point cloud. G-PCC decoder 300 may process the point cloud at least in part based on the scale factor of the point cloud. For example, G-PCC decoder 300 may scale the point cloud prior to display based on the scale factor.

In some examples, the value of the numerator syntax element plus one specifies the numerator of the scale factor of the point cloud. In some examples, the value of the denominator syntax element plus one specifies the denominator of the scale factor of the point cloud.

In some examples, a device, such as G-PCC encoder 200 or G-PCC decoder 300 may determine a parameter set identifier (ID), wherein the parameter set ID is coded using a fixed length. In some examples, the fixed length is 4 bits and the parameter set ID identifies a parameter set. In some examples, the parameter set includes one of a sequence parameter set, a geometry parameter set, or an attribute parameter set. In some examples, the parameter set is the sequence parameter set and the parameter set ID follows a syntax element indicative of a level of image data compression and precedes a syntax element indicative of whether a bounding box is present in the sequence parameter set.

In some examples, G-PCC encoder 200 or G-PCC decoder 300 may determine a value of a sampling period syntax element, the value of the sampling period syntax element being indicative of a sampling period for a level of detail index. In some examples, G-PCC encoder 200 or G-PCC decoder 300 may code the point cloud further based on or at least in part based on the sampling period. In some examples, the value of the sampling period syntax element plus 2 specifies the sampling period for the level of detail index.

In some examples, G-PCC encoder 200 or G-PCC decoder 300 may determine a lifting syntax element, wherein a value of the lifting syntax element plus 1 specifies a maximum number of nearest neighbors to be used for prediction. In some examples, G-PCC encoder 200 or G-PCC decoder 300 may code the point cloud further based on or at least in part based on the prediction.

In some examples, G-PCC encoder 200 or G-PCC decoder 300 may determine a geometry slice header syntax element, wherein a value of the geometry slice header syntax element plus 1 specifies a number of points in a geometry slice. G-PCC encoder 200 or G-PCC decoder 300 may determine an attribute bit depth syntax element, wherein a value of the attribute bit depth syntax element plus 1 specifies a bit depth of an attribute. G-PCC encoder 200 or G-PCC decoder 300 determining a number of unique segments syntax element, wherein a value of the number of unique segments syntax element plus 1 specifies a number of unique segments.

In some examples, G-PCC encoder 200 or G-PCC decoder 300 may determine determining a value of an index entry associated with a number of dimensions of a current attribute. G-PCC encoder 200 or G-PCC decoder 300 may determine whether the value of the index entry is greater than 1; and based on the value of the index entry not being greater than 1, refrain from coding at least one of a first chroma delta qp syntax element (e.g., ash_attr_qp_delta_chroma) indicative of a chroma delta qp from an initial slice qp in an active attribute parameter set, or a second chroma delta qp syntax element (e.g., ash_attr_layer_qp_delta_chroma) indicative of a chroma delta qp from an initial slice qp chroma in each layer. In some examples, coding the point cloud is further based on the number of dimensions of the current attribute.

In some examples, G-PCC decoder 300 may determine whether a value of a trisoup syntax element indicative of a size of triangle nodes is greater than 0. Based on the value of the trisoup syntax element being greater than 0, G-PCC decoder 300 may infer a value of an inferred direct coding mode enabled syntax element indicative of whether a direct mode syntax element is present in a bitstream to be 0 and infer a value of a unique geometry points syntax element indicative of whether all output points in all slices that refer to a current geometry parameter sets have unique positions within a respective slice to be 1. In some examples, G-PCC encoder 200 may determine whether a value of a trisoup syntax element indicative of a size of triangle nodes is greater than 0. Based on the value of the trisoup syntax element being greater than 0, G-PCC encoder 200 may refrain from signaling the inferred direct coding mode enabled syntax element in the bitstream and refrain from signaling the unique geometry points syntax element in the bitstream. In some examples, G-PCC encoder 200 or G-PCC decoder 300 may code the point cloud further based on or at least in part based on the value of the trisoup syntax element.

In some examples, G-PCC encoder 200 or G-PCC decoder 300 may determine a level of detail syntax element indicative of a number of points associated with a level of detail. G-PCC encoder 200 or G-PCC decoder 300 may code of the point cloud further based on or at least in part based on the number of points associated with the level of detail.

Examples in the various aspects of this disclosure may be used individually or in any combination. This disclosure includes the following clauses.

Clause 1A. A method of coding point cloud data, the method comprising: determining that a bitstream is not in conformance with a coding standard based on either a first syntax element not being equal to 0 or a second syntax element not being equal to 1, wherein: the first syntax element equal to 1 indicates whether a third syntax element may be present in geometry node syntax, the second syntax element equal to 1 indicates that in all slices that refer to the current geometry parameter set, all output points have unique positions within a slice, and the third syntax element indicates whether a single child node of the current node is a leaf node and contains one or more delta point coordinates.

Clause 1B. A method of coding a point cloud, the method comprising: coding a syntax element, wherein the syntax element plus 1 specifies a maximum number of nearest neighbors to be used for prediction; and coding the point cloud using the syntax element.

Clause 1C. A method of coding a point cloud, the method comprising: coding a syntax element, wherein the syntax element plus 2 specifies a sampling period for a level of detail index; and coding the point cloud using the syntax element.

Clause 1D. A method of coding a point cloud, the method comprising: coding a syntax element, wherein the syntax element equal to 1 specifies a sampling period for all levels of detail (LoD) are the same, and wherein the syntax element equal to 0 specifies that sampling periods for different LoD layers are different; and coding the point cloud using the syntax element.

Clause 2D. The method of clause 1D, wherein the syntax element is a first syntax element, and the method comprises: coding a second syntax element, wherein the second syntax element plus 2 specifies a constant sampling period to be used for regular sampling strategy of Levels of Detail (LoD) generating when the first syntax element is equal to 1.

Clause 3D. The method of clause 2D, further comprising: determining a value of a third syntax element plus 2 specifies the sampling period for a LoD index, wherein when the third syntax element is not present in a bitstream, a decoder infers the value of the third syntax element to be equal to a value of the second syntax element.

Clause 1E. A method of coding a point cloud, the method comprising: determining a value of a first syntax element, wherein the value of the first syntax element plus 1 specifies a scaling factor for a derivation of a square of a sampling distance for a Level of Detail (LoD) index; determining a value of a second syntax element, wherein the value of the second syntax element specifies an offset for the derivation of the square of the sampling distance for the LoD index; determining the sampling distance for the LoD index based on the value of the first syntax element and the value of the second syntax element; and coding the point cloud based on the sampling distance of the LoD index.

Clause 1F. A method of coding a point cloud, the method comprising: determining a value of a first syntax element, the value of the first syntax element indicating a numerator of a scale factor of a point cloud; determining a value of a second syntax element, the value of the second syntax element indicating a denominator of the scale factor of the point cloud; and coding the point cloud using the scale factor of the point cloud.

Clause 1G. A method of coding a point cloud, the method comprising: using a fixed-length value to indicate a syntax element, wherein the syntax element is one of a sequence parameter set (SPS) identifier, a geometry parameter set identifier, an attribute parameter set identifier, a geometry slice header identifier, or an attribute slice header identifier; and coding a bitstream that comprises an encoded representation of the point cloud, wherein the bitstream includes at least one of an SPS identified by the SPS identifier, a geometry parameter set identified by the geometry parameter set identifier, an attribute parameter set identified by the attribute parameter set identifier, a geometry slice header identified by the geometry slice header identifier, or an attribute slice header identified by the attribute slice header identifier.

Clause 2G. The method of clause 1G, wherein: the syntax element is an SPS identifier; and the syntax element is a first-occurring syntax element in an SPS.

Clause 3G. The method of clause 1G, wherein: the syntax element is an SPS identifier; and the syntax element is a first-occurring syntax element in an SPS after a set of reserved bits.

Clause 4G. The method of clause 1G, wherein: the syntax element is an SPS identifier; and the syntax element is a first-occurring syntax element in an SPS after a set of bits in which a profile is defined.

Clause 5G. The method of clause 1G, wherein: the syntax element is a first syntax element and the syntax element is an SPS identifier; and the syntax element is a first-occurring syntax element in an SPS after a unique point positions constraint flag.

Clause 6G. The method of clause 1G, wherein the syntax element is an SPS identifier; and the syntax element is a first-occurring syntax element in an SPS after a level indicator syntax element.

Clause 1H. A method of coding a point cloud, the method comprising: determining based on an index of a current attribute dimension, whether to code a syntax element, wherein the syntax element indicates one of: a luma delta quantization parameter (QP) from an initial slice QP in an active attribute parameter set, a chroma delta QP from the initial slice QP in the active attribute parameter set, or an indication of a secondary bit depth; and coding the point cloud based on the syntax element.

Clause 1I. A method of coding a point cloud, the method comprising: coding a syntax structure that comprises one or more of: a first syntax element, wherein the first syntax element plus 1 specifies a maximum number of points in a point cloud, a second syntax element, wherein the second syntax element specifies whether a number of points in each level of detail (LoD) is present in the syntax structure, a third syntax element, wherein the third syntax element plus 1 specifies a number of levels of detail for which the number of points in each LoD is signaled, or a fourth syntax element, wherein the fourth syntax element plus 1 specifies a maximum number of points in one of the levels of detail; and coding a point cloud based on the syntax structure.

Clause 1J. A method of encoding a point cloud, the method comprising: segmenting a three-dimensional object of the point cloud into a plurality of unique segments; for each of the unique segments, forming a plurality of patches by projecting the unique segment in a plurality of 2-dimensional planes; and signaling, in a bitstream, a down-scaled number of the unique segments.

Clause 2J. A method of decoding a point cloud, the method comprising: obtaining, from a bitstream, a down-scaled number of unique segments; determining a number of unique segments based on the down-scaled number of unique segments; and for each segment in a plurality of unique segments that includes the number of unique segments, reconstructing the segment based on a plurality of patches for the segment, the patches for the segment being projections of the segment into a plurality of 2-dimensional planes.

Clause 1K. A method of coding a point cloud, the method comprising: determining a value of a numerator syntax element, the value of the numerator syntax element being indicative of a numerator of a scale factor of the point cloud; determining a value of a denominator syntax element, the value of the denominator syntax element being indicative of a denominator of the scale factor of the point cloud; and coding the point cloud at least in part based on the scale factor of the point cloud.

Clause 2K. The method of clause 1K, wherein the value of the numerator syntax element plus one specifies the numerator of the scale factor of the point cloud.

Clause 3K. The method of clause 1K or 2K, wherein the value of the denominator syntax element plus one specifies the denominator of the scale factor of the point cloud.

Clause 1L. A method of coding a point cloud, the method comprising: determining a parameter set identifier (ID), wherein the parameter set ID is coded using a fixed length; and coding the point cloud based at least in part on a parameter set identified by the parameter set ID.

Clause 2L. The method of clause 1L, wherein the fixed length is 4 bits, wherein the parameter set ID identifies a parameter set, and wherein the parameter set comprises one of a sequence parameter set, a geometry parameter set, or an attribute parameter set.

Clause 3L. The method of clause 1L or 2L, wherein the parameter set comprises the sequence parameter set and wherein the parameter set ID follows a syntax element indicative of a level of image data compression and precedes a syntax element indicative of whether a bounding box is present in the sequence parameter set.

Clause 1M. A method of coding a point cloud, the method comprising: determining a value of a sampling period syntax element, the value of the sampling period syntax element being indicative of a sampling period for a level of detail index; and coding the point cloud based at least in part on the sampling period.

Clause 2M. The method of clause 1M, wherein the value of the sampling period syntax element plus 2 specifies the sampling period for the level of detail index.

Clause 1N. A method of coding a point cloud, the method comprising: determining a lifting syntax element, wherein a value of the lifting syntax element plus 1 specifies a maximum number of nearest neighbors to be used for prediction; and coding the point cloud based at least in part on the prediction.

Clause 2N. The method of clause 1N, further comprising: determining a geometry slice header syntax element, wherein a value of the geometry slice header syntax element plus 1 specifies a number of points in a geometry slice; determining an attribute bit depth syntax element, wherein a value of the attribute bit depth syntax element plus 1 specifies a bit depth of an attribute; and determining a number of unique segments syntax element, wherein a value of the number of unique segments syntax element plus 1 specifies a number of unique segments.

Clause 1O. A method of coding a point cloud, the method comprising: determining a value of an index entry associated with a number of dimensions of a current attribute; determining whether the value of the index entry is greater than 1; based on the value of the index entry not being greater than 1, refrain from coding at least one of a first chroma delta qp syntax element indicative of the chroma delta qp from an initial slice qp in an active attribute parameter set, or a second chroma delta qp syntax element indicative of the chroma delta qp from the initial slice qp chroma in each layer; and coding the point cloud based at least in part on the number of dimensions of the current attribute.

Clause 1P. A method of coding a point cloud, the method comprising: determining whether a value of a trisoup syntax element indicative of a size of triangle nodes is greater than 0, wherein the value of the trisoup syntax element being 0 is indicative of a bitstream including only octree coding syntax; based on the value of the trisoup syntax element being greater than 0: inferring a value of an inferred direct coding mode enabled syntax element indicative of whether a direct mode syntax element is present in a bitstream to be 0; and inferring a value of a unique geometry points syntax element indicative of whether all output points in all slices that refer to a current geometry parameter sets have unique positions within a respective slice to be 1; and coding the point cloud based at least in part on the value of the trisoup syntax element.

Clause 1Q. A method of coding a point cloud, the method comprising: determining a level of detail syntax element indicative of a number of points associated with a level of detail; and coding of the point cloud based at least in part on the number of points associated with the level of detail.

Clause 1R. The method of any of clauses 1A-1Q, wherein coding comprises decoding.

Clause 2R. The method of any of clauses 1A-1Q, wherein coding comprises encoding.

Clause 1S. A device for coding a point cloud, the device comprising one or more means for performing the method of any of clauses 1A-2R.

Clause 2S. The device of clause 1S, wherein the one or more means comprise one or more processors implemented in circuitry.

Clause 3S. The device of any of clauses 1S or 2S, further comprising a memory to store the data representing the point cloud.

Clause 4SL. The device of any of clauses 1S-3S, wherein the device comprises a decoder.

Clause 5SL. The device of any of clauses 1S-3S, wherein the device comprises an encoder.

Clause 6S. The device of any of clauses 1S-5S, further comprising a device to generate the point cloud.

Clause 7S. The device of any of clauses 1S-5S, further comprising a display to present imagery based on the point cloud.

Clause 8S. A computer-readable storage medium having stored thereon instructions that, when executed, cause one or more processors to perform the method of any of clauses 1A-2R.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding a point cloud, the method comprising:
   determining a value of a numerator syntax element, the value of the numerator syntax element being indicative of a numerator of a scale factor of the point cloud;
   determining a value of a denominator syntax element, the value of the denominator syntax element being indicative of a denominator of the scale factor of the point cloud; and
   processing the point cloud at least in part based on the scale factor of the point cloud.

2. The method of claim 1, wherein processing the point cloud comprises scaling the point cloud.

3. The method of claim 1, wherein the value of the numerator syntax element plus one specifies the numerator of the scale factor of the point cloud.

4. The method of claim 1, wherein the value of the denominator syntax element plus one specifies the denominator of the scale factor of the point cloud.

5. The method of claim 1, further comprising:
   determining a parameter set identifier (ID),
   wherein the parameter set ID is coded using a fixed length and wherein the coding the point cloud is further based on a parameter set identified by the parameter set ID.

6. The method of claim 5, wherein the fixed length is 4 bits, wherein the parameter set ID identifies a parameter set, and wherein the parameter set comprises one of a sequence parameter set, a geometry parameter set, or an attribute parameter set.

7. The method of claim 6, wherein the parameter set comprises the sequence parameter set and wherein the parameter set ID follows a syntax element indicative of a level of an upper limit associated with point cloud data and precedes a syntax element indicative of whether a bounding box is present in the sequence parameter set.

8. The method of claim 1, further comprising:
   determining a value of a sampling period syntax element, the value of the sampling period syntax element being indicative of a sampling period for a level of detail index,
   wherein the coding the point cloud is further based on the sampling period.

9. The method of claim 8, wherein the value of the sampling period syntax element plus 2 specifies the sampling period for the level of detail index.

10. The method of claim 1, further comprising:
    determining a lifting syntax element, wherein a value of the lifting syntax element plus 1 specifies a maximum number of nearest neighbors to be used for prediction,
    wherein coding the point cloud is further based on the prediction.

11. The method of claim 10, further comprising:
    determining a geometry slice header syntax element, wherein a value of the geometry slice header syntax element plus 1 specifies a number of points in a geometry slice;
    determining an attribute bit depth syntax element, wherein a value of the attribute bit depth syntax element plus 1 specifies a bit depth of an attribute; and
    determining a number of unique segments syntax element, wherein a value of the number of unique segments syntax element plus 1 specifies a number of unique segments.

12. The method of claim 1, further comprising:
    determining a value of an index entry associated with a number of dimensions of a current attribute;
    determining whether the value of the index entry is greater than 1; and based on the value of the index entry not being greater than 1, refrain from coding at least one of a first chroma delta qp syntax element indicative of a chroma delta qp from an initial slice qp in an active attribute parameter set, or a second chroma delta qp syntax element indicative of a chroma delta qp from an initial slice qp chroma in each layer,
    wherein coding the point cloud is further based on the number of dimensions of the current attribute.

13. The method of claim 1, further comprising:
    determining whether a value of a trisoup syntax element indicative of a size of triangle nodes is greater than 0, wherein the value of the trisoup syntax element being 0 is indicative of a bitstream including only octree coding syntax;

based on the value of the trisoup syntax element being greater than 0:

inferring a value of an inferred direct coding mode enabled syntax element indicative of whether a direct mode syntax element is present in a bitstream to be 0; and inferring a value of a unique geometry points syntax element indicative of whether all output points in all slices that refer to a current geometry parameter sets have unique positions within a respective slice to be 1, wherein coding the point cloud is further based on the value of the trisoup syntax element.

14. The method of claim 1, further comprising:

determining a level of detail syntax element indicative of a number of points associated with a level of detail, wherein the coding of the point cloud is further based on the number of points associated with the level of detail.

15. A device for coding a point cloud, the device comprising:

memory configured to store the point cloud; and one or more processors communicatively coupled to the memory, the one or more processors being configured to:

determine a value of a numerator syntax element, the value of the numerator syntax element being indicative of a numerator of a scale factor of the point cloud;

determine a value of a denominator syntax element, the value of the denominator syntax element being indicative of a denominator of the scale factor of the point cloud; and process the point cloud at least in part based on the scale factor of the point cloud.

16. The device of claim 15, wherein as part of processing the point cloud, the one or more processors are configured to scale the point cloud.

17. The device of claim 15, wherein the value of the numerator syntax element plus one specifies the numerator of the scale factor of the point cloud.

18. The device of claim 15, wherein the value of the denominator syntax element plus one specifies the denominator of the scale factor of the point cloud.

19. The device of claim 15, wherein the one or more processors are further configured to:

determine a parameter set identifier (ID), wherein the parameter set ID is coded using a fixed length and wherein coding the point cloud is further based on a parameter set identified by the parameter set ID.

20. The device of claim 19, wherein the fixed length is 4 bits, wherein the parameter set ID identifies a parameter set, and wherein the parameter set comprises one of a sequence parameter set, a geometry parameter set, or an attribute parameter set.

21. The device of claim 20, wherein the parameter set comprises the sequence parameter set and wherein the parameter set ID follows a syntax element indicative of an upper limit associated with point cloud data and precedes a syntax element indicative of whether a bounding box is present in the sequence parameter set.

22. The device of claim 15, wherein the one or more processors are further configured to:

determine a value of a sampling period syntax element, the value of the sampling period syntax element being indicative of a sampling period for a level of detail index, wherein coding the point cloud is further based on the sampling period.

23. The device of claim 22, wherein the value of the sampling period syntax element plus 2 specifies the sampling period for the level of detail index.

24. A device of claim 15, wherein the one or more processors are further configured to:

determine a lifting syntax element, wherein a value of the lifting syntax element plus 1 specifies a maximum number of nearest neighbors to be used for prediction, wherein coding the point cloud is further based on the prediction.

25. The device of claim 24, wherein the one or more processors are further configured to:

determine a geometry slice header syntax element, wherein a value of the geometry slice header syntax element plus 1 specifies a number of points in a geometry slice;

determine an attribute bit depth syntax element, wherein a value of the attribute bit depth syntax element plus 1 specifies a bit depth of an attribute; and determine a number of unique segments syntax element, wherein a value of the number of unique segments syntax element plus 1 specifies a number of unique segments.

26. The device of claim 15, wherein the one or more processors are further configured to:

determine a value of an index entry associated with a number of dimensions of a current attribute;

determine whether the value of the index entry is greater than 1; and based on the value of the index entry not being greater than 1, refrain from coding at least one of a first chroma delta qp syntax element indicative of a chroma delta qp from an initial slice qp in an active attribute parameter set, or a second chroma delta qp syntax element indicative of a chroma delta qp from an initial slice qp chroma in each layer, wherein coding the point cloud is further based on the number of dimensions of the current attribute.

27. The device of claim 15, wherein the one or more processors are further configured to:

determine whether a value of a trisoup syntax element indicative of a size of triangle nodes is greater than 0, wherein the value of the trisoup syntax element being 0 is indicative of a bitstream including only octree coding syntax;

based on the value of the trisoup syntax element being greater than 0:

infer a value of an inferred direct coding mode enabled syntax element indicative of whether a direct mode syntax element is present in a bitstream to be 0; and infer a value of a unique geometry points syntax element indicative of whether all output points in all slices that refer to a current geometry parameter sets have unique positions within a respective slice to be 1, wherein coding the point cloud is further based on the value of the trisoup syntax element.

28. The device of claim 15, wherein the one or more processors are further configured to:

determine a level of detail syntax element indicative of a number of points associated with a level of detail, wherein coding of the point cloud is further based on the number of points associated with the level of detail.

29. The device of claim 15, further comprising a display device configured to display the point cloud.

30. The device of claim 15, further comprising a point cloud capture device configured to capture the point cloud.

31. A non-transitory computer-readable storage medium storing instructions, which, when executed by one or more processors cause the one or more processors to:
   determine a value of a numerator syntax element, the value of the numerator syntax element being indicative of a numerator of a scale factor of a point cloud;
   determine a value of a denominator syntax element, the value of the denominator syntax element being indicative of a denominator of the scale factor of the point cloud; and
   process the point cloud at least in part based on the scale factor of the point cloud.

32. A device for coding a point cloud, the device comprising:
   means for determining a value of a numerator syntax element, the value of the numerator syntax element being indicative of a numerator of a scale factor of the point cloud;
   means for determining a value of a denominator syntax element, the value of the denominator syntax element being indicative of a denominator of the scale factor of the point cloud; and
   means for processing the point cloud at least in part based on the scale factor of the point cloud.

* * * * *